Fig. 6.

No. 842,031. PATENTED JAN. 22, 1907.
F. F. SLOCOMB.
LEATHER SEASONING AND FINISHING MACHINE.
APPLICATION FILED JUNE 16, 1905.

No. 842,031. PATENTED JAN. 22, 1907.
F. F. SLOCOMB.
LEATHER SEASONING AND FINISHING MACHINE.
APPLICATION FILED JUNE 16, 1905.

No. 842,031. PATENTED JAN. 22, 1907.
F. F. SLOCOMB.
LEATHER SEASONING AND FINISHING MACHINE.
APPLICATION FILED JUNE 16, 1905.

Witnesses
L. Danville,
P. F. Nagle.

Inventor
Frank F. Slocomb.
By
Wiedersheim Fairbanks
Attorneys.

No. 842,031. PATENTED JAN. 22, 1907.
F. F. SLOCOMB.
LEATHER SEASONING AND FINISHING MACHINE.
APPLICATION FILED JUNE 16, 1905.

No. 842,031. PATENTED JAN. 22, 1907.
F. F. SLOCOMB.
LEATHER SEASONING AND FINISHING MACHINE.
APPLICATION FILED JUNE 16, 1905.

Witnesses
L. Douville.
P. F. Nagle.

Inventor
Frank F. Slocomb.

By Wiedersheim Fairbanks
Attorneys

No. 842,031. PATENTED JAN. 22, 1907.
F. F. SLOCOMB.
LEATHER SEASONING AND FINISHING MACHINE.
APPLICATION FILED JUNE 16, 1905.

Witnesses
L. Donville,
P. F. Nagle.

Inventor
Frank F. Slocomb,
By Wiedersheim & Fairbanks,
Attorneys.

UNITED STATES PATENT OFFICE.

FRANK F. SLOCOMB, OF WILMINGTON, DELAWARE, ASSIGNOR TO F. F. SLOCOMB & CO., INCORPORATED, A CORPORATION OF DELAWARE.

LEATHER SEASONING AND FINISHING MACHINE.

No. 842,031.      Specification of Letters Patent.      Patented Jan. 22, 1907.

Application filed June 16, 1905. Serial No. 265,603.

*To all whom it may concern:*

Be it known that I, FRANK F. SLOCOMB, a citizen of the United States, residing at Wilmington, in the county of New Castle, State of Delaware, have invented certain new and useful Leather-Seasoning Machines, of which the following is a specification.

My invention relates to a novel construction of leather seasoning and finishing machines; and it consists of a novel construction of a table adapted to be passed between a series of brushes or rubbing devices and a device for thoroughly rubbing into the hides the seasoning compound.

It also consists of novel means for adjusting in both a vertical and a horizontal direction the pans which contain the seasoning compound.

It also consists of a novel construction of levelers or skin-holders adapted to press against opposite sides of the tables on which the hides are placed and means for adjusting the pressure of said levelers against the tables and applied in a manner to hold the hides in their natural positions by pressing them against said tables, and thus preventing any portion of the hides from being doubled over.

It also consists of a novel wiping device composed of suitable textile or other material, so disposed as to normally hang in the path of the tables which carry the hides, so that by the action of an ascending table the skin carried by the same is subjected to a wiping operation and the surplus seasoning compound is removed from the skins and drops upon deflectors which direct it into pans or other receptacles, this wiping device consisting of an elastic material that holds the wiper proper out over the line of the tables on which the skins are placed, and an auxiliary piece also of an elastic nature to cause said wipers to drop back into position after a table has passed between a pair of the same.

It also consists of novel rotating disks adapted to bear against the skins and provided with a series of spirally-radiating projections for the purpose of spreading the skins in all directions from the center of said disks.

It also consists of a novel series of spring-actuated spreading and holding strips secured to the frame carrying the rubbers and at an oblique angle in opposite directions, meeting at or near the center line of said frame.

It further consists of a novel construction of a rubbing-plunger carrying a rotating disk adapted to bear against the work and mounted in a frame at an angle inclined from the vertical, so that one segment of said disk may be made to bear harder on the work than the opposite side of the same, and also of means for adjusting the inclination of said rubbing-plunger.

It further consists of other novel features, as will be hereinafter fully set forth.

Similar numerals of reference indicate corresponding parts in the figures.

Referring to the drawings, 1 designates the frame of the machine, in which is journaled the main driving-shaft 2, provided with the fixed and loose pulleys 3 and 4, respectively. The shaft 2 has secured thereon the sprocket-wheels 5 and 6, around which are passed the chains 7 and 8, respectively. The chain 7 is also passed partly around the sprocket-wheel 9, secured to a shaft 10, journaled in the frame 1, it being noted that said shaft 10 has secured thereon the sprocket-wheel 11 (seen in Figs. 3 and 6) and pinions 12. The sprocket-chain 8 is also passed around the wheels 13 and 14, which are secured to the shafts 15 and 16, respectively, and are journaled in swinging frames 17 and 18, suspended in the frame 1 in such manner as to permit said frames 17 and 18 to approach and recede from each other for a purpose hereinafter described, said frames being preferably pivoted near their upper ends to the frame 1.

The shaft 16 has secured thereon a bevel-pinion 19, which meshes with a bevel gear-wheel 20, secured to a shaft 21, journaled in the frame 18, and is provided with a sprocket-wheel 22, around which is passed a chain 23, which also passes around the sprocket-wheels 24 to 32, both inclusive, the object of which is hereinafter described. The frame 17 has journaled therein a bevel-pinion 34, which meshes with a bevel gear-wheel 35, the object of which is to operate a train of sprocket-wheels similar to that consisting of the wheels 22 to 32, hereinbefore referred to, it being noted that the shaft 36, on which the bevel-gear 35 is secured, is also provided with a sprocket-wheel 37, partly around which is passed a chain 38, which imparts motion to the sprocket-wheel 39, and consequently to the train of wheels operating in conjunction therewith.

The pinions 12 mesh with the gear-wheels 40, which are secured to the shafts 41, which are journaled in the frame 1 and impart motion to the sprocket-wheels 42 on said shafts 41, so as to operate the sprocket-chains 43, which are passed partly around the sprocket-wheels 44 and have pivoted thereto the plates, tables, or two-faced work-support 45, upon which the skins 46 are placed to undergo the process of seasoning. One of the sprocket-wheels 44 is secured to a sprocket-wheel 48, so as to cause the latter to revolve with said wheel 44, it being understood that the wheels 44 are loosely mounted on the fixed shafts 49, which are supported in the frame 1. The wheel 48 has a sprocket-chain 50 passed partly around it, which leads to a sprocket-wheel 51, secured to a shaft 52, journaled in the frame 1, and provided with a sprocket-wheel 53, partly around which is passed a sprocket-chain 54, which imparts motion to the sprocket-wheel 55, so as to rotate the brush 56, secured to the shaft 57, which is journaled in a toggle-lever consisting of the members 58 and 59, it being noted that said members 58 are pivoted at 60 to the frame 1 and that the members 59 are pivoted to rods 61, which are guided in lugs 62, through which said rods 61 are passed, and which acts as supports for the springs 63, which encircle said rods 61, and have fitted thereon the nuts 64, between which and the lugs 62 are placed said springs 63.

The shaft 52 has secured thereon a gear-wheel 65, which meshes with a gear-wheel 66, secured to the stud-shaft 67, journaled in the frame 1, and provided with a sprocket-wheel 68, partly around which passes a chain 69, which also passes around the sprocket-wheel 70, secured to the shaft 71, on which is the brush 72.

The shafts 49 have secured thereon the brackets 73, provided with slots 74, in which are fitted the screw-threaded stems 75, which are provided with the nuts 76 and have connected therewith the pans 77, which contain the seasoning compound as supplied thereto by the pipes 78, which lead from a tank or reservoir 79. The pans 77 are provided with overflow and drain pipes 80 and 81, respectively.

Fulcrumed at 82 in the frames 17 and 18 are levers 83, (see Fig. 10,) which are provided at their inner ends with rollers 84, between which two latter the tables or plates 45 are adapted to pass, so that said rollers 84 cause the skins 46 to be properly retained on said plates 45, it being noted that springs 85 are connected with said levers 83 and to some convenient point, whereby the pressure of said rollers 84 against the skins 46 may be properly adjusted. Loosely fitted on the shafts 49 are levers 86, which are provided with rollers 87, between which the tables 45 are adapted to pass, so that the skins 46 thereon may be properly retained in position, it being noted that the pressure of the rollers 87 against the skins 46 is produced by the springs 88.

Figure 6:
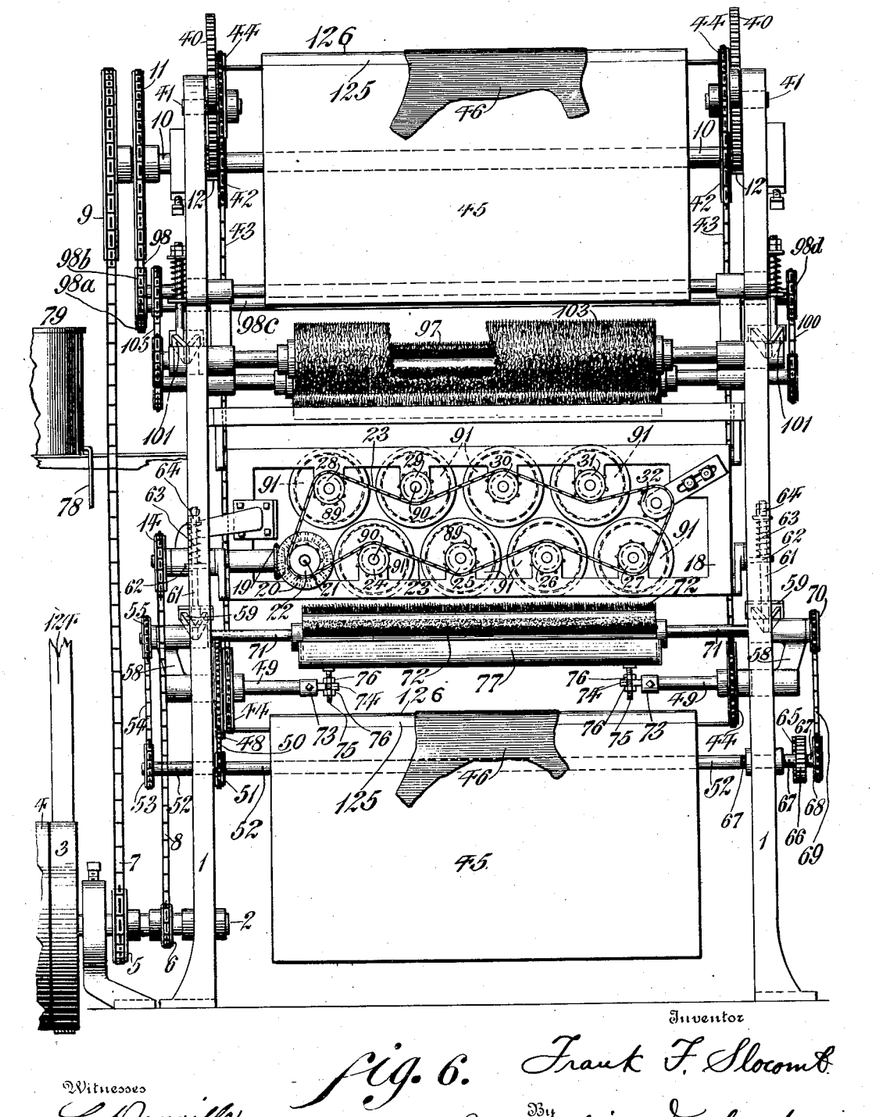
Fig. 6 represents a front elevation of the machine.
Figure 7:
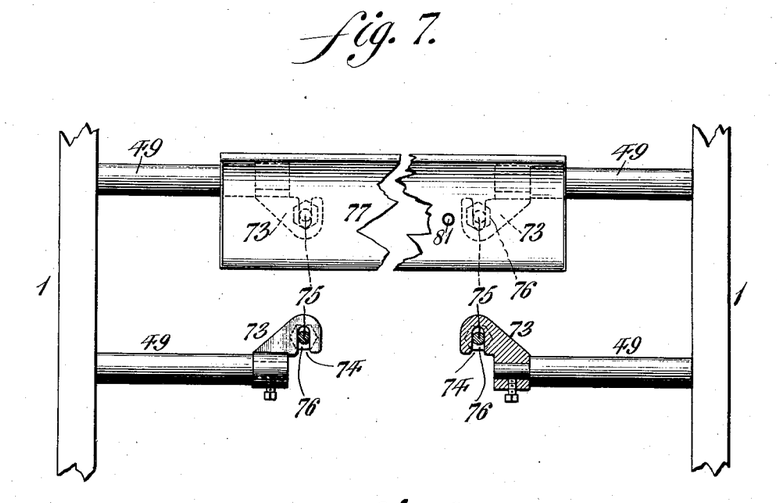
Fig. 7 represents a plan view of a detached portion of the machine.
Figure 8:
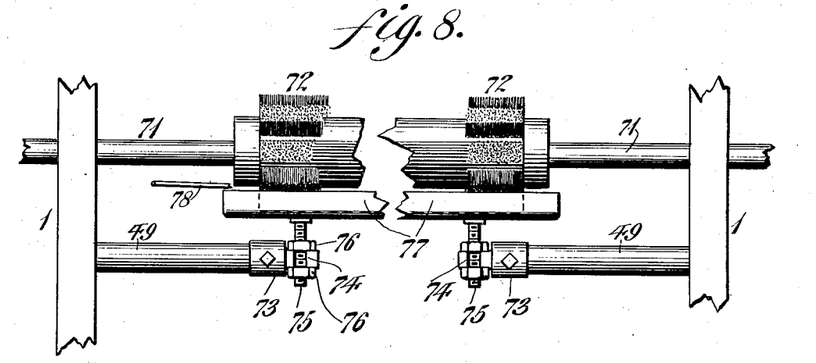
Fig. 8 represents an elevation of a detached portion of the machine.
Figure 9:
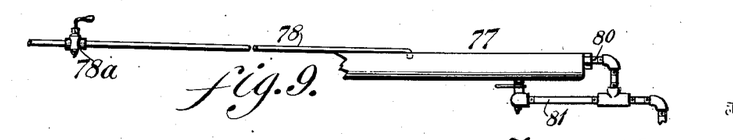
Fig. 9 represents a front elevation of a portion of a pan for the seasoning compound and pipes connected therewith.

The frames 17 and 18 have secured thereon the tubes or casings 89, in which are loosely fitted the spindles 90, which have secured thereto the rubbing-disks 91, which latter may be covered with any suitable material for thoroughly rubbing the seasoning compound into the skins 46, it being noted that said disks 91 are employed in series, as will be apparent from an inspection of Fig. 6. Each casing 89 contains a spring 92, which encircles the spindle 90 and bears against the shoulder 93 thereon and also against the shoulder 94 in a casing 89, so as to cause said rubbing-disks 91 to bear at all times against a skin 46 when the latter is passing between it and the rubbing-disks on the opposite side of the plate or table 45.

Journaled in toggle-levers 95 are brushes 96 and 97, to which motion is imparted by the sprocket-chains 98, 99, and 100, which engage with their respective sprocket-wheels, it being understood that the construction of these toggle-levers is substantially identical with that described in connection with the brushes 56 and 72, and it is therefore deemed unnecessary to describe their construction.

Journaled in toggle-levers 101 are brushes 102 and 103, to which motion is imparted by the chains 104 and 105, which engage with their respective sprocket-wheels.

Secured to the frames 17 and 18 are drip-pans 106, (see Fig. 11,) to the discharge ends of which are secured the wipers, which consist of an elastic material 107, such as rubber strips, which have connected therewith some soft material 108, such as cloth or its equivalent, and between which the skins 46 are passed during the process of seasoning.

Figure 13:
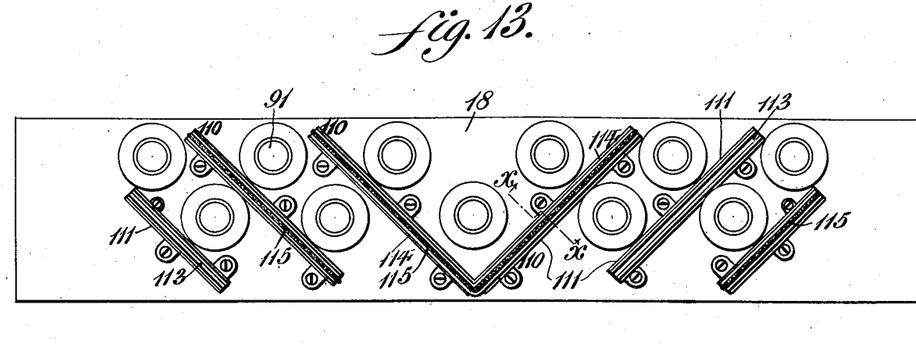
Fig. 13 represents a front elevation of the novel spreading and wiping device employed.
Figure 14:
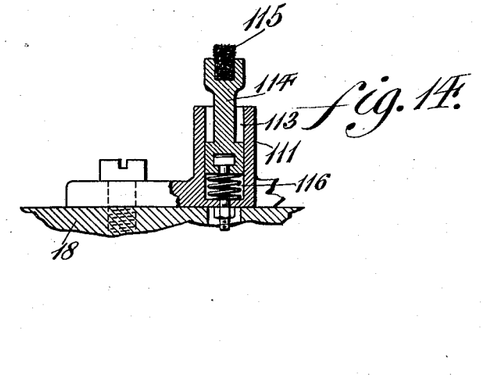
Fig. 14 represents a vertical section on line *x x*, Fig. 13, enlarged.
Figure 15:
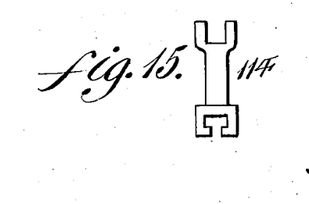
Fig. 15 represents an end elevation of a detached portion of the wiping device.

Mounted on the frames 17 and 18 is a series of combined wipers and spreaders 110 (see Fig. 13) in conjunction with the rubbing-disks 91, it being noted that these combined wipers and spreaders consist of bars 111, placed diagonally across said frames, so as to spread the skins that are brought in contact therewith and at the same time to prevent them from being creased, wrinkled, or folded by the action of the rotating disks 91. The bars 111 are provided with grooves 113, within which are placed grooved bars 114 to receive some soft material 115, such as felt, cloth, &c. The bars 114 rest upon springs 116 in order that a yielding pressure may be put upon the work.

Figures 16, 17:
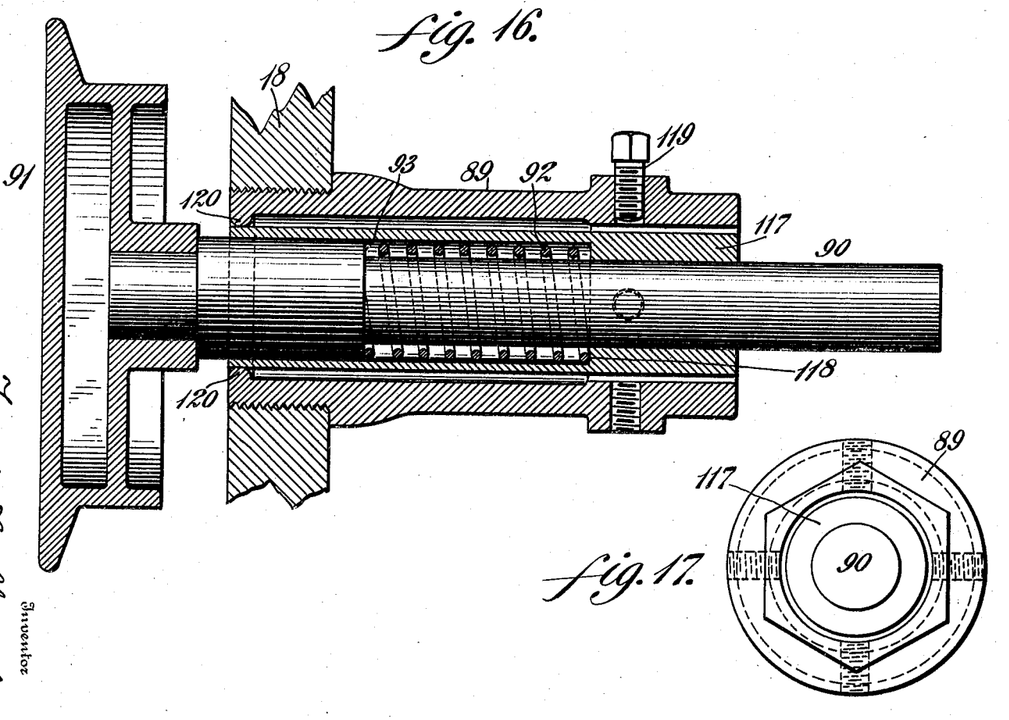
Fig. 16 represents a sectional view of a modified form of rubbing device employed.
Fig. 17 represents an end view of certain of the parts seen in Fig. 16.
Figure 18:
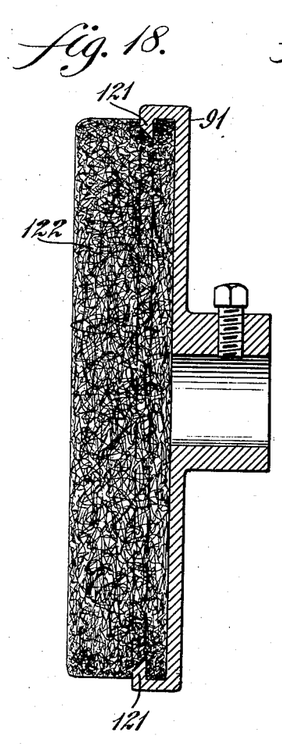
Fig. 18 represents a sectional view of another modification of a rubbing device.
Figure 19:
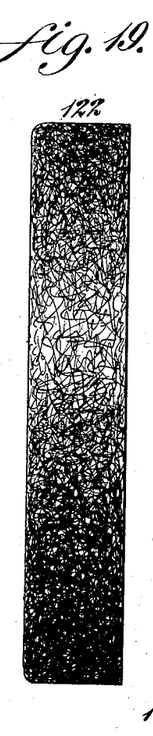
Fig. 19 represents an end elevation of a rubbing material which may be employed.
Figure 20:
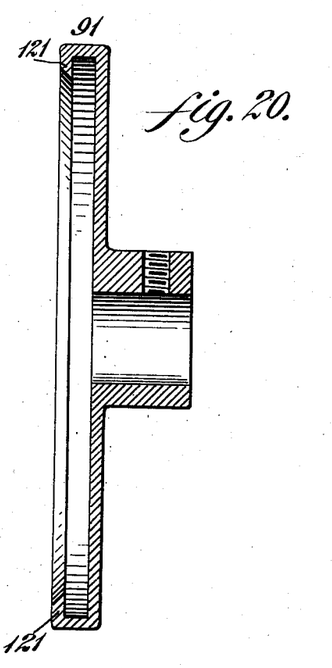
Fig 20 represents a sectional view of the rubbing-disk seen in Fig. 18 in detached position.
Figure 21:
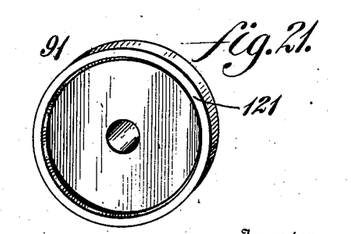
Fig. 21 represents a perspective view of the disks seen in Figs. 18 and 20 on a reduced scale.

In the construction seen in Figs. 16 and 17 the spindle 90 is fitted into a tube 117, which has a shoulder 118, against which the spring 92 abuts, while its opposite end abuts against the shoulder 93. The casing 89 is provided with set-screws 119, whose inner ends are adapted to bear against the tube 117, in the present instance four such set-screws being employed. The end of the casing adjacent the disk 91 is provided with an annular rib 120, upon which rests a portion of the tube 117, it being apparent that the construction permits of a universal adjustment of the disk 91, so that certain portions of the latter may be made to press harder against the skins 46 than other portions thereof by inclining said disk to one side or the other.

In Figs. 18, 19, 20, and 21 the disk 91 is formed with an inturned flange 121, adapted to retain securely in position the felt or other rubbing material 122.

Figure 22:
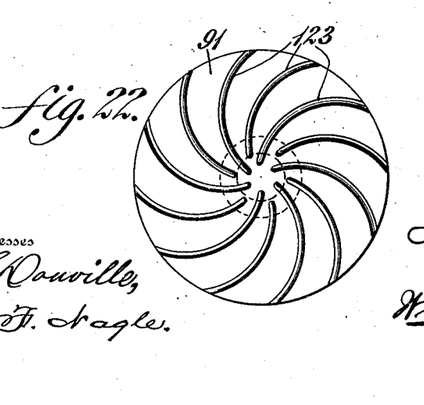
Fig. 22 represents a front elevation of a rubbing-disk with curved radiating projections on the face thereof.

In Fig. 22 the disk 91 is provided with curved ribs 123, which radiate from the center of said disk and spread the skins 45, while at the same time applying in an effective manner the seasoning compound.

Figure 5:
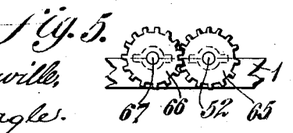

The operation is as follows: The belt 124 is shifted from the loose pulley 4 to the fixed one 3, whereupon motion is imparted to the sprocket-wheels 5 and 6, the former of which transmits motion through the chain 7 to the sprocket-wheel 9 and shaft 10, thus causing the pinions 12 to rotate and impart motion to the gear-wheels 40, and consequently to the sprocket-wheels 42, so as to operate the sprocket-chain 43 and tables or plates 45, pivoted thereto. The sprocket-chain 8 imparts motion to the wheels 13 and 14, so as to rotate the bevel-pinions 19 and 34, which transmit motion to the bevel gear-wheels 20 and 35, so that their respective sprocket-wheels 22 and 37 transmit motion to the sprocket-chains 23 and 38, it being noted that the sprocket-chain 23 by reason of its engagement with the sprocket-wheels 24 to 32, both inclusive, causes the rubbing-disks 91 to revolve, and thus thoroughly work the seasoning compound into that portion of the skins 46 which are brought in contact therewith, while a similar train of rubbing-disks 91 on the opposite side of the plates or tables 45 produce a similar result to that portion of a skin 46 brought in contact therewith. The sprocket-chain 98 imparts motion to the sprocket-wheels $98^a$ and $98^b$, it being noted that the wheel $98^a$ is secured to a shaft $98^c$, to which is also secured a sprocket-wheel $98^d$, which latter by reason of the chain 100 rotates the brush 97 in a direction opposite to that in which the brush 96 is caused to rotate by the chain 99. The sprocket-wheel 44 on the shaft 49 imparts motion to the sprocket-wheel 48, and the latter by reason of the chain 50 rotates the shaft 52, which through the medium of the sprocket-wheels 53 55 and chain 54 imparts motion to the brush 56. The gear-wheel 65, (see Fig. 5,) which is rotated by the shaft 52, imparts motion to the gear-wheel 66 and its shaft 67 (see also right-hand lower portion of Fig. 6) and by reason of the chain 69 and sprocket-wheel 70 imparts motion to the brush 72 and causes it to revolve in a direction opposite to that of the brush 56. Any slack in the several sprocket-chains may be taken up by any well-known means for that purpose. On turning the valve $78^a$ in the pipe 78 the seasoning compound flows from the tank 79 through said pipe and is discharged into the pans 77, so that the brushes 56 and 72, which dip therein, apply said compound to the skins 46 when the latter are drawn between said brushes by the ascent of the tables or plates 45. The skins 46, which are hung on the tables 45 by the operator, are then brought between the several rubbing-disks 91, which cause the seasoning compound to thoroughly enter the pores of said skins, after which they are brought between the strips 107 and the brushes 96 and 97, which wipe off any surplus seasoning compound from the skins, said brushes causing the compound to drop into the drip-pans 106. The skins 46 are then brought between brushes 102 and 103, which impart the final brushing to the skins 46 in the process of seasoning, after which a table 45 and skin 46 thereon are brought to a position from which the operator can conveniently remove said skin from the table or plate 45 and place another skin thereon to undergo the operation herein described.

When the brushes 56 and 72 are separated from each other from any cause, it is apparent that the toggle-levers in which the shafts 56 and 71 are journaled will exert a downward pull upon the rod 61 and compress the springs 63, thus permitting objects of various thickness to pass between said brushes without causing injury to any of the parts of this device, and that when the object has left said brushes the springs 63 expand and in doing this return the several parts to their normal position, it being apparent that a similar result is accomplished in connection with the toggle-levers 95 and 101.

It is obvious that, if desired, the brushes 56 and 72, for instance, which are of the "gear-teeth" type, may instead of having the rows of bristles and the spaces therebetween run parallel to and from end to end of the drum on which they are secured have said rows of bristles and spaces run diagonally or spirally around said drum.

The slots 17$^b$ in the brackets 18$^b$ (see Fig. 11) permit the drip-pans 106 to be moved either nearer to or farther from each other, as may be desired.

Figure 10:
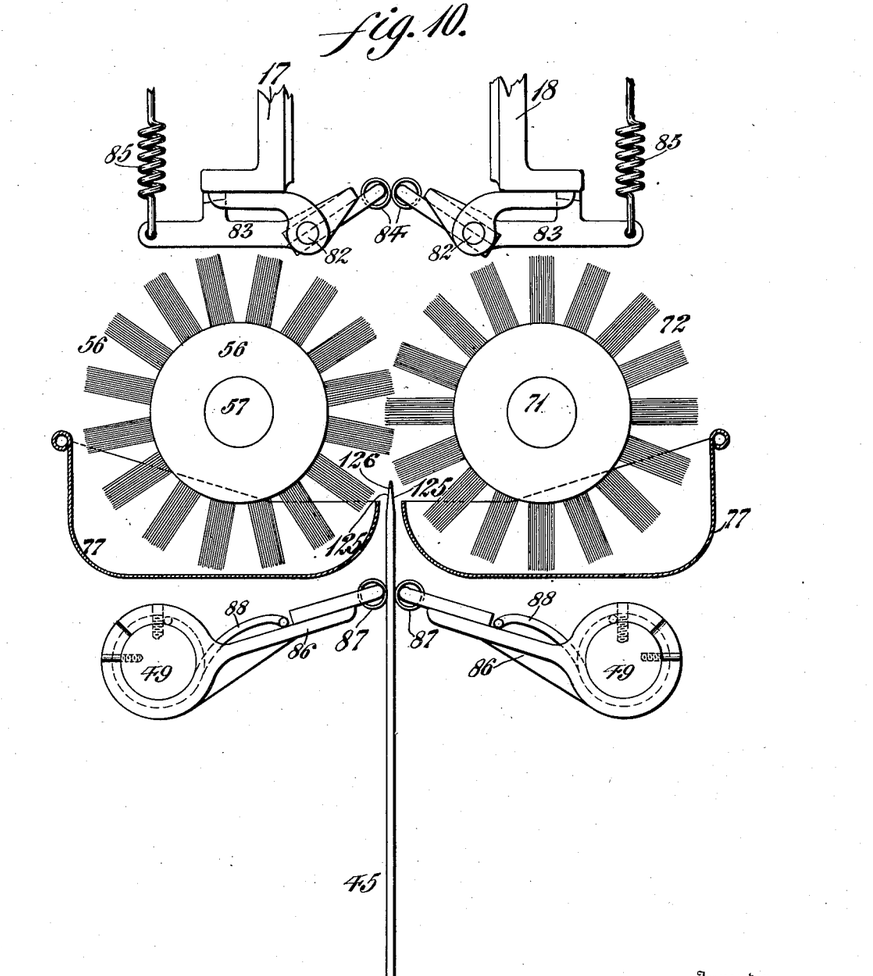
Fig. 10 represents an end elevation, on an enlarged scale, of brushes and their adjuncts as employed in connection with my leather-seasoning machine.

It will be apparent that the upper edge 126 of the table 45, as is best seen in Fig. 10, is constructed substantially like the apex of a prism and has the converging side walls 125, over which the skin depends during treatment.

I desire to call especial attention to this feature of my invention, since by its employment, in conjunction with the coacting brushing, rubbing, or wiping devices intermeshing, as I have heretofore described and particularly shown in Fig. 10, every portion of the skin is effectively treated at one operation.

In prior machines of this character with which I am familiar and wherein the skin during treatment overhangs the upper edge of the table it has been impossible by a single operation to treat that portion of the skin resting upon the upper edge of said table, thereby resulting in the skin acquiring what is technically known as a "stripe." This has necessitated the employment of a platform located at about the center of the prior machines and has also necessitated the employment of one or more additional operators to shift the skin at proper intervals, so that said stripe would not be present in the skin after treatment.

By my present invention I have not only dispensed with the platform above mentioned, thereby cheapening the cost of the machine, and also with a considerable portion of the mechanism heretofore located above the platform, but I have also dispensed with the necessity for the employment of an additional operator to shift the skin at the proper intervals, so that every portion of the same may be effectively treated, since it will be apparent that as the skin on the table 45 travels upwardly from the position seen in Fig. 10 between the pressing, rubbing, and wiping device 56 and 72 every portion of the skin which overhangs the apex 126 and the side walls 125 is effectively and automatically treated by the devices 56 and 72, as is evident. It will thus be seen that by this particular feature of my invention I greatly reduce not only the cost of construction, but am also enabled to dispense with one or more operators which have heretofore been employed.

By the employment of the spring-pressed rollers 87, assembled and correlated with respect to the upwardly-moving table 45 and its adjuncts, it will be apparent that every portion of the skin which overhangs the upper edge of the table, as heretofore explained, will be pressed against opposite sides of the table, such pressure being adjustable and applied in such a manner as to hold the skin in its natural position by pressing it against the table and in this manner preventing any portion of the same from being doubled over.

I desire to further call attention to the novel feature of the employment of the rollers 84, located above the pressing, brushing, or wiping devices 56 and 72, the function of said rollers 84 and their adjuncts being substantially the same as that already described with respect to the rollers 87.

So far as I am aware I am the first in the art to construct a leather-finishing machine possessing the instrumentalities described with respect to Fig. 10, which I have found in practice to result in marked practical advantages over any prior machine, and my claims to these features of construction are therefore to be interpreted with corresponding scope.

In prior machines with which I am familiar the part corresponding to the table 45 has been made of one or more strips of wood or metal and has been covered with a metal or leather bolster. In my present invention, I construct the table 45 of a single integral metal plate, such as sheet-iron, giving a resiliency, and having the upper edge constructed substantially as shown and described by mere filing of its cutting-corners, which has been found in practice to possess great advantages over any prior art devices.

Figures 1, 2, 3, 4:
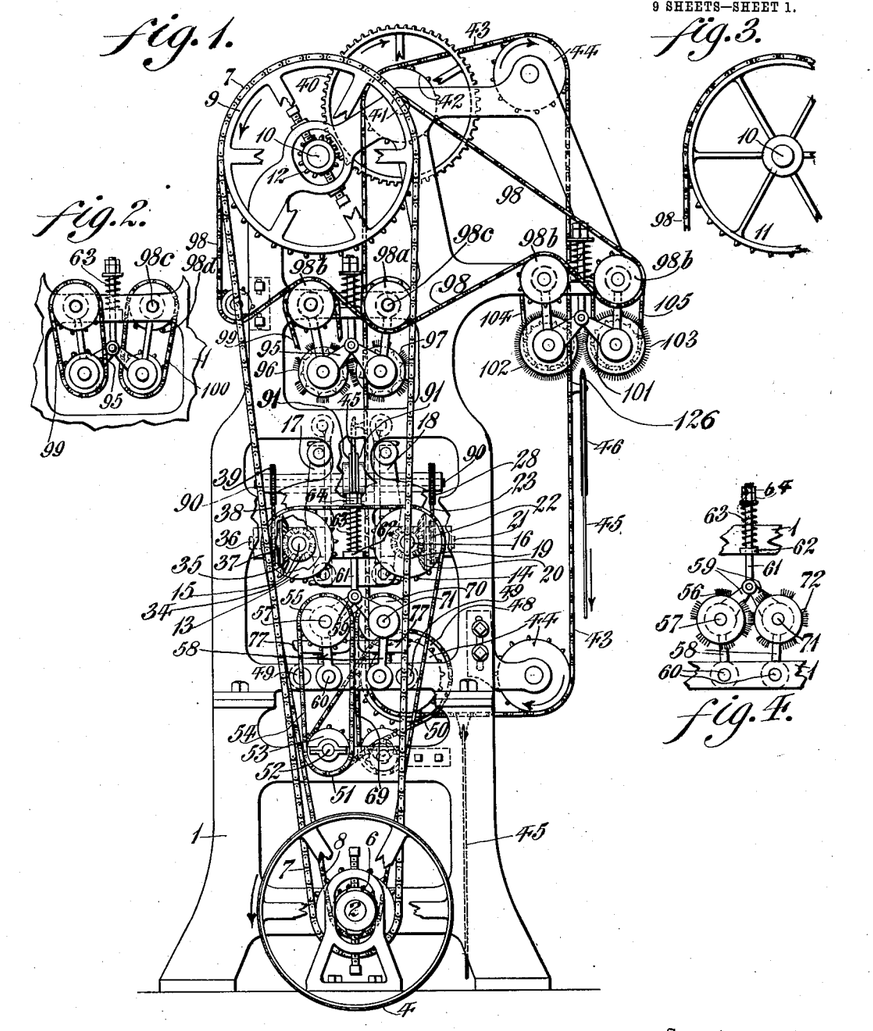
Figure 1 represents a side elevation of a leather-seasoning machine embodying my invention.
Figs. 2 to 5, both inclusive, represent end elevations of certain detached portions of the machine.

I desire further to call especial attention to the novel construction seen at the upper right-hand portion seen in Fig. 1 and in detail in Figs. 2 and 4, wherein I employ a plurality of cylinders carrying brushes or other suitable rubbing, pressing, or wiping devices so arranged as to operate on opposite sides of the upper edge of the table 45 and supported by the swinging toggle-arms against the spring 63 common to both cylinders, so that the rubbing action or pressure of one cylinder must always be equal to the other.

Figure 11:
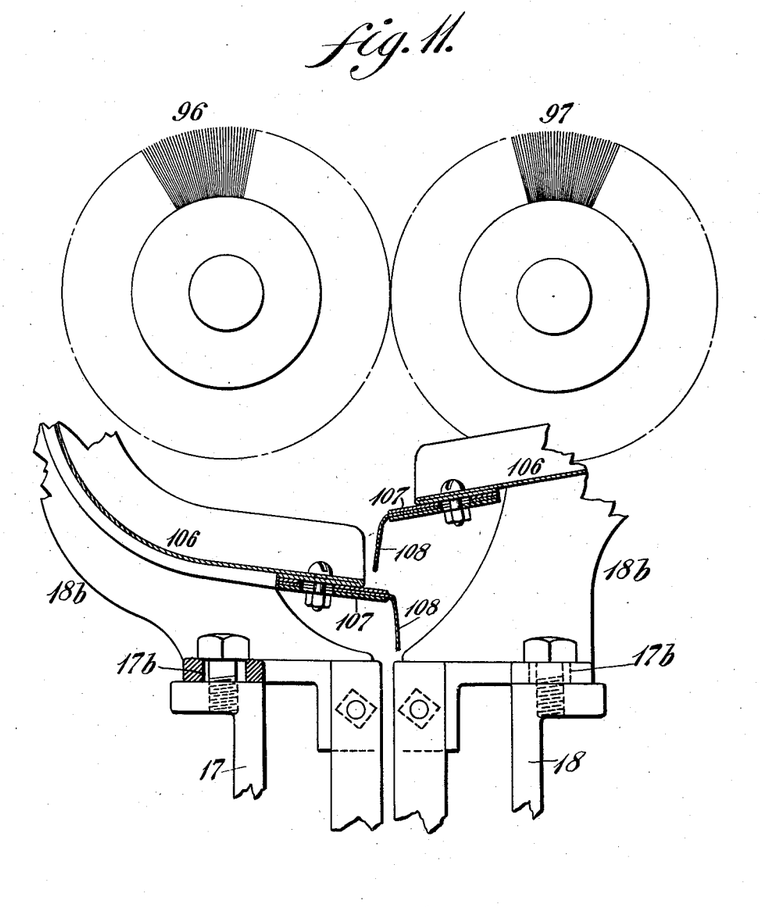
Fig. 11 represents an end elevation of certain detached portions of the machine.
Figure 12:
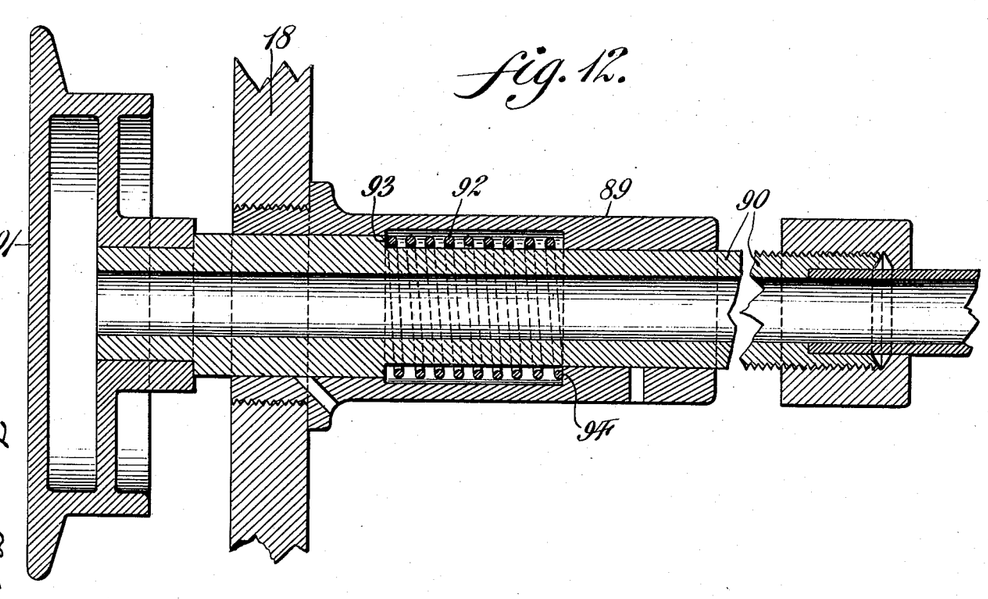
Fig. 12 represents a sectional view of the novel rubbing device employed.

I desire further to call special attention to the novel features of construction and the advantages obtained by the use of the wiping device which I employ, which is best seen in Fig. 11, said wiping device being composed of suitable textile or other material so disposed as normally to hang across the bar or plane of the table 45 carrying the skin 46, so that by the action of the ascending table said skin supported thereby is subjected to the action on said wiping device, which after the passage of one table falls into position again across the path of the next.

It will be apparent that the wiping device is preferably attached to the shield, which catches the drip from one of the cylinders and is consequently kept constantly saturated with the seasoning liquid.

It will be further apparent that the wiping device is adjustably supported and that it is constructed of sufficiently elastic material so as to hold the wiper proper out over the line of the ascending table, and also has another piece of elastic material which causes said wiper to drop back into position after the passage of the table.

It will be apparent that I have shown in the drawings one embodiment of my invention which I have found in practice to possess great advantages over the prior art devices, but that the same embodies but one form of my machine, which is capable of being modified in numerous particulars and that fall within the spirit of my invention, and I do not, therefore, desire to be limited in every instance to the precise construction shown and described, but reserve to myself the right to make all changes such as come within the scope of my invention.

Having thus described my invention, what I claim as new, and desire to secure by Letters Patent, is—

1. In a leather-finishing machine, as an improved article of manufacture, a table adapted to support a skin and composed of an integral piece of material and having at its upper edge converging walls terminating so as to form substantially a knife-edge.

2. In a machine for treating leather, a table adapted to support a skin and means for actuating said table, an edge of said table being provided with converging walls, whereby substantially a knife-edge is obtained at such edge of said table.

3. In a machine for treating leather, a table adapted to support a skin, means for actuating said table, an edge of the latter being provided with converging walls, whereby substantially a knife-edge is obtained at such edge of said table and a roll coacting with each side of said table and provided with yielding, rubbing or wiping projections thereon.

4. In a machine for treating leather, a vertically-movable table, carried edgewise and having a knife-edge and adapted to support a skin, a pair of rolls rotating in opposite directions between which said table is movable and flexible rubbing or wiping devices secured on said rolls and overlapping from each side the upper edge of said table, whereby the entire surface of the skin is operated upon.

5. In a machine for treating leather, a vertically-movable table carried edgewise and adapted to support a skin, the upper edge of said table having converging side walls and a knife-edge, a pair of rolls rotating in opposite directions between which said table is movable, devices for treating leather secured thereon and means whereby said devices may be caused to intermesh so as to overlap from each side the upper edge of said table.

6. In a leather-finishing machine, the combination of a table adapted to support a skin, means for actuating said table, an edge of the latter being provided with converging walls and a knife-edge, and a plurality of overlapping yielding, rubbing or wiping devices located in the path of said table and between which said table passes, whereby every portion of the skin resting over the edge of the table is thoroughly operated upon.

7. In a machine for treating leather, a table adapted to support a skin having an edge formed of converging walls terminating so as to form substantially a knife-edge, in combination with a pair of cylinders carrying flexible rubbing or wiping projections and means whereby said projections are caused to intermesh so as to overlap from each side the said table edge.

8. In a machine for treating leather, a table adapted to support a skin and composed of an integral piece of material having its forward edge narrowed to substantially a line in combination with a pair of cylinders rotating in opposite directions and carrying flexible rubbing or wiping projections, and means whereby said projections are caused to intermesh so as to overlap from each side the path of said table.

9. In a leather-finishing machine, the combination of a table having a knife-edge, means for actuating said table, a pair of cylinders carrying yielding, rubbing devices overlapping from each side, the upper edge of the table and arranged to operate on opposite sides of said table, and means for causing the pressure or rubbing action of each cylinder against said table to be always substantially equal to that of the other.

10. In a leather-finishing machine, the combination of a table having its acting edge formed with walls converging upon opposite sides of a median line, forming a knife-edge, and adapted to support a skin, a pair of cylinders between which said table passes, said cylinders carrying flexible rubbing or wiping projections adapted to operate on opposite sides of said table, swinging toggle-arms upon which said cylinders are supported, and a spring common to both toggle-arms, whereby the action or pressure of one cylinder is caused to always be equal to that of the other.

11. In a leather-finishing machine, a table adapted to support a skin and having its upper extremity terminating in substantially a knife-edge, a plurality of cylinders carrying suitable rubbing-surfaces thereon and arranged to operate on opposite sides of said table, swinging toggle-arms supporting said cylinders, a bolt common to said toggle-arms and a spring intermediate the ends of said bolt and a fixed point and common to said toggle-arms, whereby the pressure or rubbing action of one cylinder must always be equal to that of the other.

12. In a leather-finishing machine, the combination of a table adapted to support a skin, means for actuating said table, a pair of cylinders carrying flexible rubbing or wiping projections arranged to operate on opposite sides of said table, a leveler-holder on either side of said table and adapted to exert pressure against the latter and means for adjusting said pressure.

13. In a leather-finishing machine, a table, the upper extremity of the latter terminating in substantially a knife-edge and adapted to support a skin, means for actuating said table, a plurality of cylinders carrying suitable rubbing devices and adapted to coöperate on opposite sides of said table, a plurality of skin-holders located above and below said brushes and adapted to also press against opposite sides of said table and means for adjusting said pressure, whereby the latter is applied so as to hold the skin in its natural position by pressing it against the table and thereby prevents any portion of said skin from being doubled over.

14. In a leather-finishing machine, a pan adapted to contain a seasoning or finishing liquid, a vertically-adjustable stem for supporting said pan and means for moving said stem horizontally, whereby the position of said pan is adjustable both with respect to the brush-cylinder and the table carrying the skin.

15. In a leather-finishing machine, the combination of a table, means for actuating said table, a plurality of cylinders provided with suitable rubbing devices adapted to coact with said table, a pan adapted to contain a seasoning or finishing liquid, a support for said pan, a vertically-adjustable stem to which said support is attached and a supporting-piece to which said stem is secured, said piece being provided with a slot whereby the parts may be moved horizontally, thereby making said pan adjustable both with respect to the brush-cylinder and to the table bearing the skin.

16. In a leather-finishing machine, a table adapted to support a skin, means for actuating the latter, means for enabling said table to always hang in a vertical position and a depending wiping device composed of suitable material so disposed as to hang normally across the path or plane of said table, so that by the action of the ascending table, the skin lying upon the same is subjected to the action of said wiping device.

17. In a leather-finishing machine, a table adapted to support a skin, means for actuating the latter and a wiping device composed of suitable material so disposed as to hang normally across the path or plane of said table, so that by the action of the ascending table, the skin lying upon the same is subjected to the action of said wiping device, in combination with means for enabling said wiping device after the passage of one table to fall into position again across the path of the next table.

18. In a leather-finishing machine, a plurality of tables, means for causing said tables to ascend and a wiping device composed of suitable material so disposed as normally to hang across the path or plane of the table carrying the skin so that by the action of the ascending table, the skin carried thereby is subjected to the action of said wiping device, the latter after the passage of one table being adapted to fall into position again across the path of the next.

19. In a leather-finishing machine, the combination of an endless carrier, a plurality of tables actuated thereby and adapted to support a skin, means for actuating said tables, a plurality of rubbing devices, a wiping device composed of suitable textile or other material so disposed as to normally hang across the path or plane of the tables carrying the skins so that by the action of the ascending table, the skin lying upon the same is subjected to the action of said wiping device which after the passage of one table falls into position again across the path of the next, and a shield supporting said wiping device, said shield being adapted to catch the drip from one of said rubbing devices.

20. In a leather-finishing device, a table adapted to support a skin, a rubbing-plunger carrying a rotating disk, the face of said disk being adapted to bear against said skin, and a series of spirally-radiating projections on the face of said disk, whereby the skin is spread during treatment in all directions from the center of said disk.

21. As an improved article of manufacture, a rubbing-plunger having a rotating disk, the face of said disk being adapted to bear against a skin and said disk being provided with a series of spirally-radiating projections adapted to spread a skin in all directions from the center of said disk.

22. In a leather-finishing machine, a rotating disk provided with an inwardly-projecting rigid flange or tongue on one face thereof and a piece of soft material inserted in said flange for the purpose of treating a skin, the outer portion of said disk inclosing a portion of said soft material and the latter extending continuously across the face of said disk.

23. In a leather-finishing machine, the combination of a plurality of rubbing and pressing devices, a frame supporting the latter, a table adapted to support a skin, a pair of cylinders carrying flexible rubbing or wiping projections arranged to operate on opposite sides of said table, and a series of spreading and holding strips secured to said frame and extending at an oblique angle in opposite directions from the center line of said frame.

24. In a leather-finishing machine, the combination of a suitable frame, rubbing and pressing devices carried thereby and a series of adjustable spring-pressed spreading and holding strips secured to said frame and extending at an oblique angle in opposite directions to each other, the central strips meeting at or near the center line of said frame.

25. In a leather-finishing machine, a table, a rubbing-plunger carrying a rotating disk adapted to bear against said table, and mounted at an angle inclined from the plane of motion of said table, so that one segment of said disk may be made to bear harder on the work than the opposite side of the same.

26. In a leather-finishing machine, the combination of a table and rubbing-plungers carrying a rotating disk adapted to bear against the work and mounted in a frame at an angle inclined from the plane of motion of said table, said angle of inclination being adjustable, whereby one segment of said disk may be made to bear harder on the work than the opposite side of the same.

27. In a machine for treating leather, a table adapted to support a skin, means for supporting said table and permitting the same to always hang in a vertical position and means for actuating said table, the latter being provided at its upper edge with converging walls, whereby substantially a knife-edge is obtained at said edge of said table.

28. In a machine for treating leather, a table adapted to support a skin, means for actuating said table, means for causing said table to always hang in substantially a vertical position, an edge of said table being provided with converging walls, whereby substantially a knife-edge is obtained at the upper edge of said table and a rotary working member at a side of said table provided with yielding, rubbing or wiping projections thereon, whereby the entire surface of the skin is operated upon without necessitating any shifting thereof.

29. In a machine for treating leather, a table having an edge provided with converging walls and a knife-edge adapted to support a skin, means for actuating said table and for permitting the latter to always hang in a vertical line, a pair of rotary working members rotating in opposite directions between which said table is adapted to travel, a flexible rubbing or wiping device secured on said members and overlapping from each side of the upper edge of said table, whereby the entire surface of the skin is operated upon without necessitating shifting of the latter.

30. In a machine for treating leather, a table adapted to support a skin, means for actuating and for permitting said table to always hang in a vertical line, the upper edge of said table having converging side walls and a knife-edge, a pair of rolls rotating in opposite directions between which said table is movable, devices secured to said rolls for treating the leather, and means whereby said devices may be caused to intermesh so as to overlap from each side, the upper edge of the vertically-moving table, whereby any necessity for shifting the skin on said table is avoided.

31. In a leather-finishing machine, the combination of a table adapted to support a skin, means for actuating said table, the upper edge of the latter being provided with converging walls and a knife-edge, means for permitting the table to always hang in a vertical line, a plurality of overlapping, yielding, rubbing or wiping devices located in the path of said table and between which said table passes, whereby every portion of the skin resting upon or over the edge of said table is thoroughly operated upon without the necessity of shifting the skin.

32. In a leather-finishing machine, the combination of a table having its upper edge provided with converging walls, terminating in substantially a knife-edge, means for actuating said table and for permitting the latter to hang in substantially a vertical line, a pair of rotary wiping members having yielding or rubbing devices operating on opposite sides of said table and means for causing the pressure or rubbing action of each rotary member against said table to be always substantially equal.

33. In a leather-finishing machine, the combination of a table adapted to support a skin, said table having converging walls forming a knife-edge at its upper portion, means for actuating said table and for permitting the latter to hang in a vertical line, a pair of rolls between which said table passes, said rolls carrying flexible rubbing or wiping devices adapted to operate on opposite sides of said table, swinging toggle-arms upon which said rolls are supported, and a spring common to said toggle-arms, whereby the action or pressure of one roll is caused to always be equal to that of the other.

34. In a device of the character described, a table having its forward-acting edge tapered in the direction of its length in opposite directions upon opposite sides of a median line and brought to a knife-edge.

FRANK F. SLOCOMB.

Witnesses:
H. S. FAIRBANKS,
C. D. McVAY.